United States Patent [19]

Wirth et al.

[11] 3,874,903

[45] Apr. 1, 1975

[54] EPOXY RESINS

[75] Inventors: Thaddäus Wirth, Mainz; Joachim Peter, Weilburg; Walter Sprenger, Dieburg; Jürgen Ritz, Nierstein, all of Germany

[73] Assignee: Reichhold-Albert-Chemie-Aktiengesellschaft, Hamburg, Germany

[22] Filed: Mar. 29, 1972

[21] Appl. No.: 239,344

[30] Foreign Application Priority Data
Jan. 31, 1972 Germany.................... 2204413

[52] U.S. Cl.................... 117/72, 117/75, 117/132, 117/138.8 R, 117/161 UG, 117/161 ZB
[51] Int. Cl...................... C07d 103/02, B44d 1/14
[58] Field of Search......... 117/72, 75, 132, 161 UG, 117/161 ZB, 138.8 R

[56] References Cited
UNITED STATES PATENTS

| | | | |
|---|---|---|---|
| 3,435,981 | 4/1969 | Emmerson et al. | 117/75 |
| 3,488,212 | 1/1970 | MacIntosh | 117/75 |
| 3,625,742 | 12/1971 | Baldwin | 117/75 |
| 3,655,426 | 4/1972 | Fuchs | 117/75 |

FOREIGN PATENTS OR APPLICATIONS

| | | | |
|---|---|---|---|
| 1,036,574 | 7/1966 | United Kingdom | 117/75 |
| 1,224,743 | 9/1966 | Germany | 117/75 |

Primary Examiner—William R. Trenor
Attorney, Agent, or Firm—Littlepage, Quaintance, Murphy & Dobyns

[57] ABSTRACT

An article of manufacture comprising a substrate which is coated with a primer and a second coating adhering to the primer. The primer comprising as an essential ingredient an epoxy resin modified by acetoacetic ester groups which may also contain chemically bound metal atoms as a chelate. The cover layer contains a homo- or a copolymer of a fluorine-containing vinyl monomer having up to two fluorine atoms or a combination of such polymers.

9 Claims, No Drawings

EPOXY RESINS

This invention concerns improvements in a primer based on an epoxy resin modified by acetoacetic ester groups, and more particularly relates to an adhesive primer. The epoxy resin contains at least 0.2 acetoacetic ester groups per 1,000 molecular weight units. The epoxy resin contains at most 0.9 acetoacetic ester groups per 1000 molecular weight units when having an average molecular weight of from 350 to 500 and at most 2.5 acetoacetic ester groups per 1,000 molecular weight units when having an average molecular weight of from 900 to 1,400. The epoxy resin can be modified by reaction of at least some of said acetoacetic ester groups (a) with formaldehyde and an amine to form a Mannich base; or (b) with an aldehyde to form alkylol groups; or (c) with an amine to form beta-aminocrotonic acid ester groups.

The modified epoxy resins in the new primer are described in the copending U.S. application to Jürgen Ritz and Johannes Reese, Ser. No. 239,325 now abandoned, of even date. They can be obtained if the free hydroxy groups of an epoxy resin are at least partially reacted with diketene in the presence of a catalyst to form acetoacetic ester groups according to a method as it is described in the mentioned copending U.S. application. The diketene substantially only reacts with the alcoholic hydroxy groups of the epoxy resin so that acetoacetic ester is formed which at the same time has epoxide groups. The modified epoxy resins useful in the present invention generally contain at least 0.2 and at most 2.5 acetoacetic ester groups per 1000 molecular weight units when the modified epoxy resin has an average molecular weight of from 350 to 500. When the modified epoxy resin has a molecular weight of 900 to 1,400, it can contain at most 2.5 acetoacetic ester groups per 1,000 molecular weight units.

The epoxy resin in the primer can also contain chemically bound atoms of at least one metal being at least partially bound as a chelate. The epoxy resin can contain chemically bound atoms of at least one chelate forming metal from Groups I to VI or Ia to VIIIa of the Periodic Table according to Meyer and Mendelejeff which metal atoms are at least partially bound as a chelate. Metal valencies which are not bound to the epoxy resin are bound to a beta-di-carbonyl compound or to hydrocarbon radicals having two to eight carbon atoms.

As the epoxide groups of the metal-free and metal-containing epoxy resins according to the invention are intact they can be subjected to the conventional reactions of epoxide groups e.g., conventional hardening with polyamines. Suitable polyamines include aliphatic primary and secondary amines such as ethylenediamine, diethylene-triamine, triethylenetetramine, aromatic and cycloaliphatic amines, polyaminoamides, polyaminoimines (i.e., reaction products of polyamines with polycarboxylic acids which however still contain free primary or secondary amino groups). Other hardening agents include hydroxy containing synthetic resins such a phenol, urea and melamine resins or the etherification products thereof, polycarboxylic anhydrides, epoxy resin/amine adducts, polyhydric alcohols and the like. In addition the epoxide groups may also have been esterified with organic acids e.g., fatty acids with two to 22 C-atoms such as acetic acid or natural fatty acids, or the epoxide groups can be reacted with secondary amines. It has also been found for example, that the cold hardening of the new primers based on an epoxy resin with all hardeners containing amino groups, i.e., both with low molecular weight amines and also with e.g., polyaminoamide resins, proceeds much more rapidly than that of conventional epoxy resins.

Due to the good hardening and other processing characteristics of the epoxy resins — both with and without bound metal atoms — in the primers according to the invention the latter can be used in many ways. Primers according to the invention have good lustre, good hardness, elasticity and adhesive characteristics especially on metal surfaces and on metallic substrates. This excellent adhesion properties are due to the polar groups present in the modified epoxy resins. Hardening can take place at room temperature or at elevated temperature. The primers lose their tackiness more rapidly than coatings based on conventional mon-modified epoxy resins. In addition, the primers have a light colour, particularly those of metal-containing resins whose metal forms colourless ions such as zinc and tin.

Suitable substrates are e.g., metals such as iron, zinc, copper, aluminum or the alloys thereof such as steel, brass, bronze or the like; wood, ceramic, glass; structural materials such as cement and concrete; thermoplastics and duroplasts, in particular those with polar groups such as epoxy resins, phenolic resins, aminoplasts, polyester resins, alkyd resins, and polyurethanes; vinyl polymers, e.g., polyvinyl chloride, vinyl chloride/vinyl acetate copolymers; polyamides; polyimides, acrylic polymers or the like. The substrates can also be made more adhesive or corrosion resistant by suitable mechanical and/or chemical pretreatment, e.g., by roughening such as rubbing with emery paper, sand blasting, treatment with oxidising agents, phosphating or the like.

If the primer is in the form of an adhesive primer then over-coatings of various substances can be selected e.g., those mentioned as substrates above, preferably thermoplasts and/or duroplasts. For example, it is also possible to arrange above the primer a layer containing a homo and/or copolymer of fluorine-containing vinylpolymers with up to two fluorine atoms.

Over-coatings for the adhesive primer include: 1. Physically drying lacquers based on acrylic resins such as acrylic ester/acrylic acid/styrene copolymers; homo or copolymers such as chloropolypropylene or the above copolymers; cyclorubber, chlorinated rubber or nitrocellulose;

2. Oxidatively drying lacquers based on alkyd resins or drying oils;

3. Curable lacquers based on acid-hardening alkyd-/amino-resins, alkyd/isocyanate resins and/or acid-hardening phenolic/amino-resin combinations;

4. Stoving lacquers based on alkyd/amino-resin combinations, self-cross-linking acrylic resins, acrylic-/amino-resin combinations, epoxy/phenolic resin combinations, or epoxy/amino-resin combinations.

It has surprisingly been found that coatings of polymers of fluorine-containing vinyl polymers, which otherwise have a relatively poor adhesion, adhere particular well to the primers according to the invention. The good adhesion of these fluorine-containing coatings corresponds to the values GT OA to GT 1A according to the test specifications of DIN 53,151. Examples of fluorine-containing vinyl polymers are e.g., polyvinyl fluoride and polyvinylidene fluoride.

It is also possible to place over the adhesive primer one or more layers, not only coatings, but also laminates or fillers. The various layers can be applied in a conventional manner, e.g., by coating, spraying, dipping, flooding, rolling or by electrodip varnishing, powder coating such as vortex sintering, or electrostatically or the like, as can the application of the primer provided that these conventional processes are suitable for this purpose.

Depending on the particular application, the primers produced from the modified epoxy resins can also be mixed with other resins, e.g., conventional epoxy resins, alkyd resins, polyesters, phenolic and amino resins, polyurethanes or with polymerisation resins provided that they are compatible e.g., hydrocarbon resins or acrylic resins. Generally the proportion of synthetic resin in the primer is 20 to 100 percent, preferably 50 to 85 percent by weight based on the solids content. For the production of adhesives the products according to the invention are advantageously used in admixture with polyaminoamide resins, in particular as two-component adhesives.

The primers based on the modified epoxy resins can contain further additives in the conventional quantities such as fillers e.g., talc, mica, kaolin, chalk, quartz, flour, ground shale, asbestos flour, barium sulphate; dyes; pigments e.g., titanium dioxide, strontium chromate, zinc chromate barium chromate, lead cyanamide, lead chromate, lead silicochromate, calcium molybdate, manganese phosphate, strontium molybdate, zinc oxide, zinc silicate, zinc tetraoxychromate, zinc potassium chromate, cadmium sulphide, iron oxide, carbon black, ultramarine blue or phthalocyanine pigments; running agents; solvents, preferably those containing polar groups such as ethyleneglycol monethyl-, monomethyl- or monobutyl-ethers or the monoacetates thereof; acetone; methylethylketone; diisobutylketone; ethyl acetate; butyl acetate; dimethylformamide; dimethylsulphoxide; mixtures of aliphatic and aromatic hydrocarbons (known under the trade name "Solvess.") with boiling points of 150° to 220°C as well as the solvents mentioned hereinbefore; lubricants, suspending agents such as finely divided silica, bentonite, colloidal silicates and the like. The mixtures are thereby appropriately adapted to the particular application.

The proportion of filler and pigment in the primer can vary depending on the number and the chemical structure of the over coatings or coverings. It can generally be up to 60 percent by weight based on the solids content. If the primer is to serve e.g., as an adhesion-giving intermediate layer, particularly for coverings with fluorine-containing vinyl polymers, the filler and pigment proportion is generally made lower. Generally, however, it is made higher if the primer is to be used as a filler or the like.

The use of the modified epoxy resins as primers according to the invention is of practical interest as adhesion-giving and corrosion-protecting layers when coating and cladding objects which come into contact with corrosive media, e.g., for pipe lines, tanks and structural members for the chemical industry, for protective coatings against atmospheric influences as well as primers for coatings on household equipment and machines, vehicle parts, structural components for electronic purposes and for thermally stressed objects. It is also possible to produce, with the primers according to the invention, laminates optionally containing metals e.g., as foils, webs or nettings; asbestos fibres; glass fibres; mica; paper; plastics or other layers.

In order that the invention may be better understood the following Examples are given by way of illustration; parts and percentages are by weight.

EXAMPLE 1

A lacquer is made from 50 g of solid epoxy resin with an epoxide number of 3.09 containing acetoacetic ester groups prepared by reacting an epoxy resin of 4,4'-diphenylolpropane and epichlorohydrin with diketene in solution under nitrogen atmosphere, 4 g of melamine-formaldehyde resin and 46 g of a solvent mixture of 60 parts ethyleneglycol monoethylether, 20 parts 4-methyl-4-hydroxy-pentan-2-one and 20 parts of a mixture of aliphatic and aromatic hydrocarbons, boiling point 150° to 220°C. The lacquer is applied to a substrate comprising a metal sheet and hardened for 10 minutes at 190°C in the stoving oven with circulating air. A colourless, well adhering and elastic coating is obtained which can be used as such or be over-coated with coatings based on 70 percent of a non-drying alkyd resin of phthalic acid and pentaerythritol modified with 50 percent coconut oil fatty acid and 30 percent of an etherified melamine resin.

EXAMPLE 2

A mixture consisting of 35 g of epoxy resin modified with acetoacetic ester groups as in Example 1, 7 g of urea-formaldehyde resin, 33.6 g of titanium dioxide and 24.4 g of the solvent mixture used in Example 1 is applied to a substrate comprising an aluminium sheet and hardened for 15 minutes at 195°C. A corrosion-proof primer is obtained with an excellent adhesion. Onto this coat is sprayed a coating of 70 percent acrylic resin (based on acrylic acid, hydroxyethyl acrylate and styrene) and 30 percent etherified melamine resin and hardened. A coating with excellent adhesion is obtained.

EXAMPLE 3

To a brass plate is applied a mixture of 45 g of epoxy resin according to Example 1, 6.75 g of urea-formaldehyde resin, 8.50 g of titanium dioxide, 4.25 g of talc and 35.50 g of the solvent mixture used in Example 1 and the coating is hardened for 2 minutes at 225°C. To the coating is applied a further coat of polyvinylidene fluoride dispersion and this is hardened for 3 minutes at 230°C. A well adhering, corrosion-resistant coating with excellent adhesion to the brass substrate is obtained.

EXAMPLE 4

To a phosphated steel sheet is applied a mixture of 39.0 g of the epoxy resin product of Example 1 containing 2.45 percent of aluminium bound as a complex, 3.82 g of urea-formaldehyde resin, 7.6 g of titanium dioxide, 3.33 g of talc, 4.19 g of strontium chromate and 42.06 g of the solvent mixture used in Example 1 and the coating is hardened for 90 seconds at 230°C. To the well adhering, highly elastic coating is applied a further coat of polyvinylidene fluoride dispersion which is then dried for 2 minutes at 250°C. A well adhering, corrosion-proof coating is obtained which even after overburning several times i.e., brief superheating or too long stoving retains good adhesion to the steel substrate, yellowing resistance and elasticity.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. An article of manufacture comprising:
   A. a substrate selected from the group consisting of metals, wood, ceramic, glass, cement, concrete, and synthetic resins, and
   B. a first coating which is a primer adhering to the substrate, wherein the first coating consists essentially of a component selected from the group consisting of
      a. an epoxy resin modified by acetoacetic ester groups,
      b. an epoxy resin as under (a) in combination with a suitable hardening agent,
      c. an epoxy resin as under (a) in combination with at least one additive selected from the group consisting of fillers, pigments, dyes, lubricants, suspending agents and solvents,
      d. an epoxy resin as under (a) in combination with at least one other resin selected from the group consisting of epoxy, alkyd, polyester, phenolic and amino resins, polyurethanes, polyaminoimide resins, polymerisation resins selected from the group consisting of (d1) hydrocarbon resins, (d2) acrylic resins,
      e. a combination of at least two of (a) to (d), wherein the epoxy resin (a) is present in an amount of at least 20 per cent by weight, referred to the total solids content, and
   C. a second coating adhering to the first coating wherein the second coating is a polymer of a fluorine-containing vinyl monomer.

2. An article of manufacture according to claim 1 in which the epoxy resin content of the primer is 20 to 100% by weight based on the solids content.

3. An article of manufacture according to claim 1 wherein the epoxy resin of the primer contains at least 0.2 acetoacetic ester groups per 1,000 molecular weight units.

4. An article of manufacture according to claim 1 wherein the epoxy resin of the primer contains at most 0.9 acetoacetic ester groups per 1,000 molecular weight units when having an average molecular weight of from 350 to 500 and at most 2.5 acetoacetic ester groups per 1,000 molecular weight units when having an average molecular weight of from 900 to 1,400.

5. An article of manufacture according to claim 1 wherein in the primer containing epoxy resin metal valencies which are not bound to the epoxy resin are bound to a beta-dicarbonyl compound or to hydrocarbon radicals having 2 to 8 carbon atoms.

6. An article of manufacture according to claim 1 wherein in the primer containing epoxy resin the epoxy resin has been modified by reaction of at least some of said acetoacetic ester groups (a) with formaldehyde and an amine to form a Mannich base; or (b) with an aldehyde to form alkylol groups; or (c) with an amine to form beta-amino crotonic acid ester groups.

7. An article of manufacture of claim 1 comprising:
   A. a metal substrate, and
   B. a first coating adhering to the substrate, wherein the first coating is a modified epoxy resin,
   wherein the epoxy resin is the reaction product of 4,4'-diphenylolpropane and epichlorohydrin,
   wherein the modified epoxy resin contains from 0.2 to 2.5 acetoacetic ester groups per 1,000 molecular weight units, and
   C. a second coating adhering to the first coating wherein the second coating is polyvinylidene fluoride.

8. An article of manufacture according to claim 1 wherein in the primer containing epoxy resin said epoxy resin contains chemically bound atoms of at least one chelate forming metal from Groups I to VI or Ia to VIIIa of the Periodic Table according to Meyer and Mendelejeff which metal atoms are at least partially bound as a chelate.

9. An article of manufacture according to claim 1 in which the epoxy resin of the primer containing epoxy resin is present in a combination with fillers and pigments the content of the two latter is up to 60% by weight based on the solids content.

* * * * *